May 21, 1968     K. R. GUENTHER ET AL     3,384,491
PROCESS FOR PRODUCING HIGH PROTEIN FEED
SUPPLEMENTS FROM HYDROCARBONS
Filed April 15, 1964
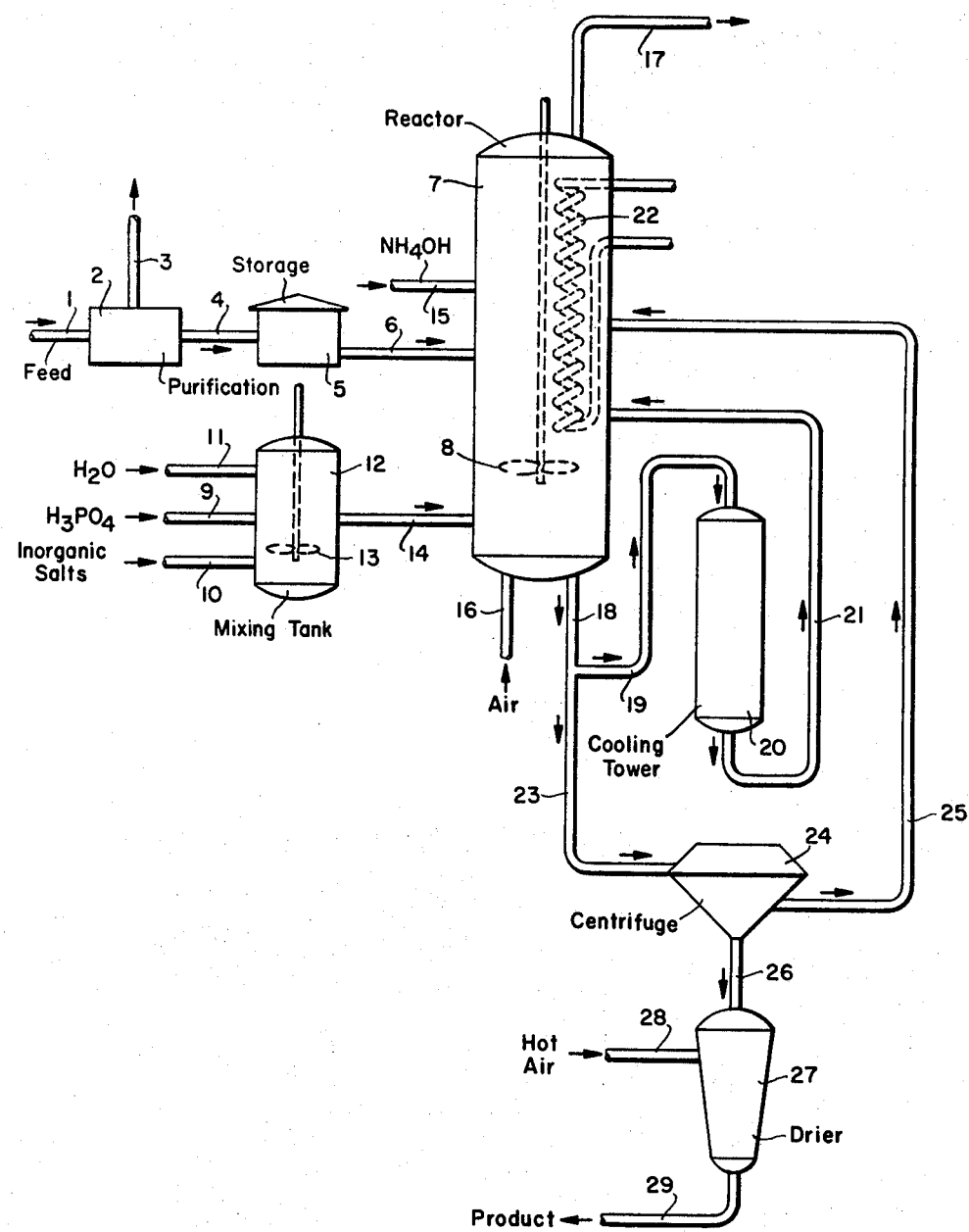
KARL R. GUENTHER
MICHAEL B. PERKINS     INVENTORS
BY *Frank A. Simmock*
PATENT ATTORNEY United States Patent Office 3,384,491
Patented May 21, 1968

3,384,491
PROCESS FOR PRODUCING HIGH PROTEIN FEED
SUPPLEMENTS FROM HYDROCARBONS
Karl R. Guenther, Livonia, Mich., and Michael B. Perkins,
Linden, N.J., assignors to Esso Research and Engineering Company, a corporation of Delaware
Continuation-in-part of application Ser. No. 281,895,
May 21, 1963. This application Apr. 15, 1964, Ser.
No. 360,141
11 Claims. (Cl. 99—9)

ABSTRACT OF THE DISCLOSURE

High protein food is obtained by growing bacteria on hydrocarbons in a reactor wherein the bacteria are in the log phase and are maintained in a concentration at least as great as that for which the exponential increase in population increment is equal to the increment continuously withdrawn, the liquid residence time in said reactor being maintained at 1.5 to 4 times the minimum generation time for the reactor.

---

This application is a continuation-in-part of United States Ser. No. 281,895, filed May 21, 1963 now abandoned.

This invention relates to improved economic processes for growing bacteria on cheap hydrocarbon feeds and recovering directly an excellent high e.g. 70–75% protein food supplement for animals and/or humans. More particularly, this invention relates to continuously supplying a liquid or gaseous hydrocarbon feed, a liquid aqueous mineral salts medium and excess oxygen-containing gas to a stirred reactor containing said feed, aqueous medium and bacteria capable of growing on said hydrocarbons, the said bacteria being in the log phase (population increasing exponentially) of growth and being present in a concentration equal to or greater than that for which the exponential increase in population increment is equal to the increment continuously withdrawn, continuously withdrawing a portion of the reaction mixture at a rate to maintain critical liquid residence times, separating microorganisms from the withdrawn mixture and finally drying the microorganisms to obtain directly the desired high protein bacteria feed supplement. Yet more particularly in a preferred embodiment this invention relates to supplying critical amounts of the hydrocarbon feed based on the aqueous salts medium. Most particularly in a preferred embodiment this invention relates to carrying out this process utilizing as the feed a selected cut from a $C_{11}$ to $C_{30}$ paraffinic petroleum feed which has been purified to reduce the level of aromatics to below ½ wt. percent, utilizing as the bacteria *Micrococcus cerificans* and preferably utilizing optimum nonlimiting inorganic salts reaction mediums to obtain high selectivity to bacteria rather than byproduct esters.

It has now been discovered that an excellent high protein feed supplement can be extremely economically prepared from cheap petroleum feeds by the present critical process. The first and most important requirement of this process is the use of critically short liquid residence times in the reactor. It has now been surprisingly discovered that by utilizing liquid residence times of 1.5–4 times, preferably 2–3 times the minimum generation time for the particular organism e.g. *Micrococcus cerificans* that a large shift in selectivity to bacteria occurs as follows.

(1) 2.7 times minimum generation time:

77# n-paraffin+89# $O_2$+22# inorganic salts, $NH_3$, etc.
→100# dried cells +62# $CO_2$+26# $H_2O$ (2) 5.3 times minimum generation time:

89# n-paraffin+127# $O_2$+22# inorganic salts, $NH_3$, etc.→100# dried cells +97# $CO_2$+41# $H_2O$ "Minimum generation time" as used in this specification is defined as the minimum time for the bacteria concentration to double occurring in the log phase (i.e. straight line on a log plot) of batch fermentation conducted under optimum conditions, i.e. temperature pH and nonlimiting (including use of excess agitation) supply of hydocarbon, $O_2$ and optimum aqueous salts medium to the bacteria. If a growth promoter is used in the continuous process the "minimum generation time" referred to above should include supply of the said promoter. This minimum generation time for the particular bacteria may be determined from the literature or conveniently empirically determined in the laboratory preferably using a 1500 r.p.m. paddle stirred batch fermentor.

With respect to the surprising nature of the improvement obtained by limiting liquid residence time it would not be expected that short residence times would improve selectivity nor would one skilled in the art ordinarily attempt to use such short liquid residence times in the absence of the presently discovered improvement in selectivity. Thus, (1) it is theoretically impossible to use in a continuous process liquid residence times less than 1.45 times the minimum generation time, i.e. in any reaction where the rate of formation of product is proportional to the amount of product present the minimum residence time for a continuous process is $1/ln2$ or 1.45 times the batch minimum generation time, and (2) since the continuous process is subject to upsets and considerable variations from optimum conditions a margin of safety of at least 1, preferably 2, times the minimum residence time for a continuous process (viz 1.45 times minimum generation time) would be applied to prevent the population of bacteria from being depleted, i.e. washed from the reactor. It is noted that the only cost for this safety factor is increase in size in the reactor and that this is a minor cost in the total cost of the process.

It is noted that it would not be expected that short residence times would appreciably improve selectivity and that the commercial advantages obtained by utilizing short liquid residence times are extremely large as follows:

(1) *Cooling costs.*—All bacteria growth processes are highly exothermic e.g. 5,000–10,000 B.t.u./lb. cells and are conducted at temperatures near room temperature. Therefore, refrigeration rather than water cooling is ordinarily required. The cost of this refrigeration in a typical process where short residence time is utilized (Equation 1) is approximately 40% of the costs associated with fermentation (i.e. total costs composed of raw material costs plus fermentation costs plus product recovery costs). With longer residence times (Equation 2) this cost is increased approximately 60% (i.e. proportional to the additional amount of oxygen utilized to form $CO_2$ and water.

(2) *Power costs.*—All the present bacteria growth processes involve hydrocarbons dissolved in low concentration in an aqueous mineral salts growth medium. Since oxygen has very low solubility in water, very large power requirements (agitation and blowers) are necessary to obtain transfer of oxygen to the microorganism. These power requirements are not reduced by expedients such as emulsification although they can be reduced by using oxygen enriched air rather than straight air. However, the cost of providing oxygen enriched air is quite substantial. In any event utilizing short residence times (Equation 1), power costs are approximately 40% of fermentation costs and these costs would be increased by about 40% or more by utilizing longer residence times (Equation 2).

(3) Hydrocarbon costs.—Hydrocarbon costs are, of course, reduced 15% by utilizing short reaction times. However, these costs are small compared to the costs above referred to.

(4) Reactor equipment costs.—The size of the reactor is also reduced 15% by utilizing short reaction times. However, this cost improvement also is small compared to 1 and 2 above.

With respect to one preferred embodiment, that of using as the feed a $C_6$ to $C_{30}$ hydrocarbon feed it has now been discovered that purification of this feed to exclude essentially all aromatics is highly desirable or necessary. It has now been surprisingly discovered that both the monocyclic and the polycyclic aromatic materials normally present in petroleum feeds are not utilized by many bacteria yet these aromatics are adsorbed on or into the bacteria even when the byproduct esters and unconverted oil are minimized by the present preferred procedures. Thus, these materials are difficult to remove e.g. extensive animal feeding tests show that levels of any polycyclic or monocyclic aromatic in animal feeds above 0.05 wt. percent greatly decrease animal growth. Thus, even if the possibly carcinogenic heterocyclic aromatics are removed, the monocyclic aromatics would be extremely detrimental to animal growth. The present process, by eliminating essentially all aromatics from the feed permits an extremely economic recovery of the bacteria since residual unconverted hydrocarbon feed and product esters, etc., retained on the bacteria, have now been found not to poison or to be otherwise detrimental to animal growth. These products retained on the bacteria are, however, of no advantage and are intentionally minimized by the presently discovered preferred techniques described below.

Thus, it has been discovered that by making available large amounts of air in the range of 0.5 to 4.0, preferably 0.8 to 2.5 volumes of air supplied to the reactor/volume reactor liquid/minute per wt. percent dry bacteria concentration in the reactor/liquid residence time in hours improved selectivity is obtained. In an alternate embodiment $O_2$ enriched air is used. With this material the amount required to be supplied is reduced proportionally as the $O_2$ content is increased. In this embodiment enriched air is above 70%, more preferably above 90% $O_2$ due to the saving afforded by reduced compressor costs. Thus, the initial conversion of the oxygen present to fatty acid occurs, which the bacteria then utilizes for growth producing $CO_2$ and water as byproducts thereof. In the absence of sufficient air the initial reaction to produce acids continues but insufficient air is available for the bacteria to utilize the acids for growth and they are converted to esters which accumulate in the cells.

In another preferred embodiment it has been discovered that by utilizing oxygen enriched air very high levels of hydrocarbon e.g. above 2 wt. percent on the inorganic salt aqueous medium (including $NH_4OH$) supplied can be used and at the same time obtain complete utilization of the hydrocarbon i.e. low levels of hydrocarbon in the equilibrium mixture continuously being withdrawn. Additionally, surprisingly, the high selectivity to bacteria vs. esters of the present process is retained even with these high hydrocarbon levels. Preferred levels are 1 to 5, more preferred 1 to 3 wt. percent based on the inorganic salt aqueous medium used with $O_2$ enriched air.

Finally, specifically by utilizing a preferred aqueous growth medium containing a critical combination of inorganic salts medium, selectivities are greatly increased so that a 10-fold decrease in esters produced is obtained, i.e., the equilibrium mixture after drying contains 2% esters on bacteria as compared to 20% obtained with only a slight variation in the mineral salts reaction medium.

All of the above taken in combination greatly decrease costs of production of animal feeds from hydrocarbons. Thus, for example, power requirements necessary for stirring the reactor and for supplying air are greatly reduced in addition to the enormous improvement obtained by being able to separate the bacteria by a simple process which does not require extremely expensive purification steps, e.g. repeated washing with surfactants, extraction, etc., which the prior art has indicated are necessary to produce from petroleum microorganism feeds for animals.

Finally, it is preferred to use coagulants, e.g. cationic surfactants to decrease initial separation, e.g. centrifugation or settling costs.

The present invention will be more clearly understood from a consideration of the accompanying drawing describing a preferred apparatus for continuously carrying out the present invention utilizing a preferred $C_6$–$C_{30}$ feed containing aromatics. Referring to the drawing, hydrocarbon feed is fed through line 1 to feed purification 2 where nonnormal materials and impurities are removed through line 3. This feed purification is preferably an absorption of the normal hydrocarbons, preferably paraffins, by 5A molecular sieves followed by desorption and then a clean-up of the desorbed normal hydrocarbons with 13× sieves or silica gel to absorb remaining impurities including aromatics. The purified normal paraffins are passed through line 4 to normal paraffin storage 5. The normal paraffins are supplied through line 6 to reactor 7 containing the bacteria and stirred by a stirrer 8. Phosphoric acid is supplied through line 9, inorganic salts are supplied through line 10 and water is supplied through line 11 to mixing tank 12 equipped with a stirrer 13. The mixed salt solution is supplied through line 14 to the reactor. Ammonium hydroxide is also supplied to the reactor through line 15. Air or enriched air is supplied to the reactor through line 16. Air $CO_2$ and water vapors are vented to the atmosphere from the reactor through line 17. A mixture of product cells, salt solution and small amounts of unreacted hydrocarbon is continuously removed through line 18 and a part of this mixture is recycled through line 19, cooling tower 20 and line 21 to provide cooling in the reactor. Additionally or alternatively, a cooling coil 22 in the reactor may also be employed. The remainder of the product mixture is supplied through line 23 to centrifuges or settling 24, where product cells are separated. Supernatant liquid is withdrawn through line 25 and recycled to the reactor. Separated concentrated cells are passed through line 26 to driers 27, preferably spray driers, utilizing hot air supplied through line 28. Dried product cells are removed through line 29. Preferably the centrifuge separation is such that the wt. percent dry cells (not including intracellular water) in the paste from the centrifuge is 7–28 wt. percent dry cells, more preferably 10–15 wt. percent dry cells. Such a separation can be economically effected and due to the critical reaction conditions the final product cells after drying will contain only 7–10 wt. percent total fat of which about 75% is esters and 5–9 wt. percent inorganic salts. Thus, the losses of the latter which are not particularly advantageous in the animal feed are not excessive. It is noted that instead of the centrifuge separation other methods such as filtration or settling with or without filter aids or coagulants may be used to make the initial separation of cells and, of course, various drying procedures may be used. In any event it is noted that this procedure is extremely economic in that no special complex separations and surfactant washing to remove oil and byproducts are required (although they may be used in broader aspects of this invention) to obtain a final product having extremely high protein content and no impurities detrimental to animals or humans.

According to the present invention feeds for the present process are $C_1$–$C_{30}$ petroleum feeds, preferably gas oils boiling in the range of 190 to 400° C., preferably 190 to 320° C. Other preferred feeds are $C_1$–$C_{30}$ normal and isoparaffins, cycloparaffins, monoolefins, diolefins, and aromatics and mixtures of these. Particularly preferred are normal paraffins. Feeds available in large quantities and those particularly suitable are $C_{11}$–$C_{30}$ normal paraffins from gas oils, light naphthas, and normally gaseous feeds such as methane, ethane and propane and mixtures of these such as natural gas. Where normally gaseous feeds are used these are, of course, preferably supplied as gases directly to the reactor through spargers. Critical to the success of this invention in its most preferred embodiment is a purification of any $C_6$–$C_{30}$ feed to reduce the level of aromatics both polycyclic and monocyclic to below 0.5 wt. percent, preferably below 0.1 wt. percent, preferably below 100 p.p.m. This is necessary because it has now been surprisingly discovered that aromatics are not attacked by the microorganisms and when the economic separation procedures of this invention are used without such feed purification the product is extremely detrimental to animals and humans. By detrimental it is meant that these materials decrease the rate of growth of animals on these feeds. This is completely independent of the small amounts of polycyclic aromatics which are considered to be carcinogenic and which are preferably kept from the final product. These latter materials can be separated from the feed selectively by several processes but it is surprising that the amount of monocyclic aromatic which constitute a significant part of the total aromatics, i.e. 20% to 50% must also be removed in order to allow the present process to be useful. It is noted that a number of other processes described in the literature as being commercial or potentially commercial suggest extremely expensive surfactant washing, extracting and other procedures used on the product in order to obtain a good animal feed material.

The preferred process for purification of the hydrocarbon, preferably gas oil feed is a molecular sieve process. This process selectively absorbs the straight chain hydrocarbons on the molecular sieve and thus purifies them substantially completely from aromatics. A preferred method of carrying out this purification of gas oils process is described in U.S. 3,070,542 and the disclosure in this patent is hereby incorporated by reference as a preferred technique for purifying the feeds of the present invention. The essence of this patent is the finding that by preloading of the molecular sieve by the displacing medium, preferably ammonia, and by introducing the displacing medium along with the feed, the rate of adsorption is increased and subsequent desorption is greatly eased particularly with high molecular weight materials. It is also preferred to use an additional clean-up step as described in S.N. 223,078, filed Sept. 12, 1962 or S.N. 223,057, filed Sept. 12, 1962 and these specifications are hereby also incorporated by reference. Suitable bacteria for use in the present process are any bacteria which will grow on hydrocarbons and which are not toxic to animals, selected from the class Schizomycetes and including the following subclasses.

I. Pseudomonadales
II. Chlamydrobacteriales
III. Hyphomicrobiales
IV. Eubacteriales
V. Actinomycetales
VI. Caryophonales
VII. Beggiatoales
VIII. Myxobacterales
IX. Spirochaetales
X. Mycoplasmatales Preferred bacteria for use in the present invention are as follows: *Micrococcus cerificans, Pseudomonas aeruginosa, Pseudomonas flourescens, Nocardia opaca, Nocardia rubra, Nocardia coralina, Pseudomonas methanica, Pseudomonas desmolyticum, Mycobacterium phleie.* Especially preferred is *Micrococcus cerificans*, isolated and identified by Dr. R. E. Kallio et al., Journal of Bacteriology, vol. 78, No. 3 pp. 441–448 (September 1959). Cultures of this organism have been deposited in the American Type Culture Collection, 212 M St., NW., Washington 7, D.C. as No. 14987. The full identification of this material is as follows:

Morphology: Cells are small, spherical, tending to be elliptical in old cultures and in media high in nitrogen. Cells from defined media average 0.5 to 1.0$\mu$ in diameter, from complex media cell diameters 1.0 to 2.0$\mu$. Cells occur singly or in clumps. Immotile, metachromatic granules and sudanophilic granules are not observed.

Gram reaction: Negative

Colonies on defined agar are small (1 mm.), circular, convex, having entire edge. Colonies on nutrient agar are larger (2 to 5 mm.), raised mucoid, generally round.

Pigmentation: white, beige or tan variants occur.

Obligately aerobic. A wide variety of materials supports growth, yeast extract, casein hydrolyzate, long-chain alcohols and acids, long-chain normal alkanes and olefins.

Carbohydrate fermentation: No carbohydrates are fermented. Aerobically, many carbohydrates are assimilated. These include glucose, maltose, mannitol, sucrose, lactose, arabinose, rhamnose, sorbitol, dulcitol, and inulin. Aerobically glucose is utilized with acid production. Gluconic acid has been identified.

Nitrate reduction: Negative.

Gelatin liquifaction: Generally negative. Slow liquifaction may occur in some strains.

Urea hydrolysis: Negative.

Catalase is produced.

Hydrogen is not utilized.

Optimal temperature is 25° C.

Optimal growth pH is 7.0 to 8.5.

Source: Iowa soil.

Habitat: Soils.

It is noted that a more recent identification conducted in the present inventors' laboratories show the organism is probably an arthrobacter rather than a Micrococcus and closely resembles *Arthrobacter ureafacenes*. The following summary of products indicates the reasons for the preferred identification of this organism as an arthrobacter:

| Micrococcus | "M. cerificans" | Arthrobacter |
| --- | --- | --- |
| Always Gram positive early in fermentation. | Always Gram neg. | Gram neg. or variable. |
| Cells in irregular masses. | Like Arthrobacter. | Short filament formation may occur with some rudimentary budding. |
| Never change size. | do | Larger than usual coccoidal cells may appear at times. |
| Never occur in a rod state. | do | Large coccoid cells give rise to rod shaped cells. |
| Carbohydrates frequently fermented. | do | Little or no acid from carbohydrates. |

As previously mentioned, air is continuously introduced into the culture, preferably in the bottom of the fermentation vessel through a sparger or other mechanical device to break up the air into fine bubbles. As previously mentioned, preferably the reactor is stirred by a paddle stirrer or other means to completely distribute the oxygen throughout the reactant culture medium. For example, paddle stirrer(s) may be used having a horsepower rating of 1 to 100, preferably 5 to 30, per 1000 gal. of liquid reactant culture medium. Preferred rates of stirring with a paddle stirrer are above 1000 r.p.m., preferably above 1500 r.p.m. Preferably vortex aeration, i.e. use of a vertical cylinder extending from just beneath the surface of the liquid to near the bottom of the vessel is used to obtain better mixing and to draw the foam formed in the fermentation from the surface of the liquid and distribute it through the tube to the bottom of the vessel.

The source of nitrogen may be an organic or inorganic nitrogen derivative. In the organic category may be mentioned proteins, acid hydrolyzed proteins, enzyme-digested proteins, amino acids, yeast extract, asparagine, and urea. For reasons of economy it is usually preferable to employ an inorganic compound such as ammonia, ammonium hydroxide, or salts thereof such as ammonium phosphate, ammonium citrate and so forth. A very convenient method of supplying nitrogen is to add ammonium hydroxide. In this way the pH range of 5.5 to 7.5 and the requisite nitrogen is supplied. For this purpose ammonia gas also can be bubbled directly into the culture. Alternatively, additional acid or base may be added if necessary from time to time, e.g. $H_2SO_4$. It is noted that the present process requires no expensive grow stimulants such as vitamins, etc.

In addition to the energy and nitrogen sources critical amounts of selected mineral nutrients are also required in the medium to maximize selectivity. Thus, potassium, sulphur and phosphorus are required. These elements may be supplied in the form of their salts. Thus, the potassium may be supplied as potassium chloride, phosphate, sulphate, citrate, acetate, nitrate and so forth. Sulphur and phosphorus are supplied in the form of sulphates, or phosphates such as alkali metal or ammonium phosphates. The preferred critical amounts of minerals used to maximize selectivity are as follows (amounts for different concentrations of cells obtained by multiplying by the particular percent:

| Mineral | Preferred Wt. Percent Salts in Aqueous Medium Supplied Based on Growing 1 wt. Percent Concentration Cells | Especially preferred Wt. Percent Salts in Aqueous Medium Supplied Based on Growing 1 wt. Percent Concentration Cells |
|---|---|---|
| $H_3PO_4$ P | 0.01–1.0 | 0.05–0.25 |
| $Na_2SO_4$ S and Na | 0.01–0.5 | 0.025–0.05 |
| KCl K and Cl | 0.01–0.5 | 0.05–0.10 |
| $MgSO_4$ Mg | 0.005–0.5 | 0.02–0.05 |
| $CaCl_2$ Ca | 0.005–0.5 | 0.02–0.05 |

In addition, the following minerals are also required but the amounts are less critical as follows:

| Mineral | Preferred Wt. Percent Salt Supplied Based on Growing 1 wt. Percent concentration Cells | Expecially Preferred Wt. Percent Salt Supplied Based on Growing 1 wt. Percent Concentration Cells |
|---|---|---|
| $FeSO_4$ Fe | 0.001–0.1 | 0.005–0.02 |
| $MnSO_4$ Mn | 0.001–0.1 | 0.005–0.02 |

In all the above the ions indicated supplied as other salts in amounts stoichiometrically the same (by calculation) may also less preferably be used.

Additionally nitrogen must be supplied as a salt, ammonia, ammonium salt or ammonium hydroxide, preferably an ammonia material most preferably ammonium hydroxide in amounts of 0.08 to 0.20, preferably 0.1 to 0.15 gm. nitrogen per gm. of dried cells produced.

The temperature of the culture can be varied from about 20 to 45° C., preferably 25 to 40° C. In maintaining proper temperature levels it is usually necessary to heat the system during early stages of start-up whereas as the culture proceeds it will be observed that heat is generated in the culture and hence cooling will be necessary to maintain the desired temperature. This may be economically accomplished by recycling material through a cooler or by utilizing cooling coils in the reactor as previously mentioned.

The amount of hydrocarbon supplied (including recycle) based on aqueous salt medium (including $NH_4OH$) supplied is 1 to 10 wt. percent, preferably 1 to 5 wt. percent, especially 0.5 to 2 wt. percent when straight air is used.

Liquid residence time for the preferred bacteria, i.e. "*Micrococcus cerificans*" (Arthrobacter), i.e. the volume of liquid in the reactor divided by the amount of feed materials supplied (and products removed so as to maintain a constant liquid level in the reactor) per hour is in general 1 to 10 hours, preferably 1 to 3 hours, more preferably 1.5 to 2.5 hours. These preferred residence times not only improve selectivity but also reduce $O_2$ requirements.

The present invention will be more clearly understood from a consideration of the following examples.

Example 1.—Effect of different feeds on bacteria yield and animal growth

*Micrococcus cerificans* was grown on an aqueous salt medium containing a Lirik gas oil fraction as the sole source of carbon. The product cells were harvested by means of centrifugation and washed once with water, recentrifuged and washed twice with acetone and filtered. The following results were obtained including results of using the bacteria cells as the sole source of protein in rat diets as per the protein evaluation test described in Official Methods of Analysis, 9th ed., 1960, Sec. 39.133(c) and (f). In this test the sample in question is added to a diet so that the protein level in the diet is 9.09%. The rats are maintained on this diet for a period of four weeks. Weight gain and food consumption are recorded weekly. The weight gained per unit food consumed is calculated at the end of the fourth week and the value is compared to that obtained for a simultaneous test when casein is the protein source. Ten rats are used for both the casein and sample tests.

| Feedstock | Wt. Percent Paraffin | Cell Yield | Biological Nutritive Value (Casein=100) Rat Growth Method |
|---|---|---|---|
| Lirik Gas Oil | 60 | 59 | 59 |
| Slack Wax | 76 | 97 | 53 |
| Hexadecane | 100 | 105 | 76 |

The improvement in nutritive value can probably be attributed to the fact that the unreacted hydrocarbon residues from the gas oil and slack wax are animal growth inhibitors while pure or relatively pure (i.e. purified as herein described) paraffins show no adverse effects. This is illustrated by the following additional experimental data. The acetone wash from the Lirik gas oil was concentrated by boiling off the acetone first at atmospheric pressure and then in vacuo. After extracting the oil residue with 5% NaOH to remove any organic acids the neutral fraction was submitted for mass spectrometry analysis and found to have the following composition.

Percent
Paraffins _____ 31.4
Naphthenes _____ 19.2
Aromatics _____ 49.4

This material was then mixed with ANRC (American Nutritional Research Council) reference casein at levels of 1, 3 and 5 wt. percent and this casein used as the sole source of protein in rat diets as per the protein evaluation test described in Official Methods of Analysis, 9th ed., 1960, Sec. 39.133(c) and (f). In the same manner a number of casein samples were prepared containing 1, 3, 5, 7 and 10% purified paraffins (5A molecular sieve and clean-up) which consisted of essentially pure normal paraffins with approximately 70 p.p.m. aromatics.

The average growth of rats in these diets was compared to the average growth of those on unadulterated casein (10 rats per test sample) over a period of four weeks. The results of this test are shown in the following table.

| Level of Hydrocarbon in Casein (wt. percent) | Rat Growth as Percent of Casein Control | |
|---|---|---|
| | Lirik Gas Oil Residue | Molecular Sieve Paraffins |
| 1 | 77.5 | 103 |
| 3 | 75.0 | 100 |
| 5 | 61.9 | 104 |
| 7 | | 94 |
| 10 | | 103 |

Further proof of the inhibitory effect of acetone extractable material is provided by the fact that when *Micrococcus cerificans* HO–1 grown on slack wax was not washed with acetone prior to utilization as a feed it was virtually worthless as a protein supplement since rats grown on a diet containing this material, as the sole source of protein, gained only 5 grams in two weeks, which was only 14% as much as those grown on the casein control in the same period.

Example 2.—Criticality of residence time

*Micrococcus cerificans* was grown continuously in the following medium:

|  | G./liter |
|---|---|
| Slack wax | 10–20 |
| Spann 60—Tweens 60 | 0.6–1.2 |
| $H_3PO_4$ | 5 |
| KCl | 1 |
| $CaCl_2$ | 0.5 |
| $MgSO_4 \cdot 7H_2O$ | 0.2 |
| $MnSO_4 \cdot 4H_2O$ | 0.2 |
| $FeSO_4 \cdot 7H_2O$ | 0.2 |
| NaCl | 0.2 |

Concentrated $NH_4OH$ added as needed to control pH at 7.

Above nutrients dissolved or dispersed in tap water to obtain desired concentrations.

The temperature of the reaction was maintained at 30° C. and the fermentation carried out in 7.5 liter New Brunswick fermentor with an operating capacity of 4 liters. The air flow rate and agitator speed were varied so as to obtain aeration efficiencies of from 3.5 to 7.0 millimols $O_2$/liter minute as measured by the sulfite oxidation method of Cooper and Fernstrom, Ind. & Eng. Chem. 36, 405–509 (1944).

The residence time in the fermentor was varied from 1.3 to 4.0 hours and the effect of the variation is shown below.

| Residence time (hours): | Selectivity wt. percent dried cells based on slack wax converted to cells and $CO_2$ |
|---|---|
| 4.0 | 107 |
| 4.0 | 102 |
| 2.0 | 120 |
| 2.0 | 128 |
| 2.0 | 134 |
| 2.0 | 133 |
| 2.0 | 121 |
| 1.3 | 138 |

It should be noted that this improvement is great not only because of the increased selectivity but also because this 30% improvent also reduces both the $O_2$ requirement and the heat removal requirement by 50%.

This experiment was repeated using a pure normal paraffin feed, i.e. n-hexadecane and analyses for unreacted hydrocarbon were accomplished by means of vapor fractometry. In this case it was possible to calculate selectivities as net percent product formed per unit hydrocarbon consumed. These results are shown below.

| Residence time (hours): | Selectivity (wt. percent dried cells based on hydrocarbon consumed) |
|---|---|
| 4 | 105±2 |
| 2 | 116±6 |

Each of these values represents an average of from 5 to 6 experimental runs.

Example 3.—Criticality of air rate

*Micrococcus cerificans* was grown as described in Example 2 using a slack wax concentration of 20 grams/liter. The stirrer speed and air rate was varied in two experiments and the results are shown below.

| Aeration Efficiency (Millimoles $O_2$/liter min.) | Reactor Residence Time, hrs. | Air Rate (v./v. min.) | Wt. percent Hydrocarbon based on inorganic salt aqueous medium | Stirrer Speed (r.p.m.) | Percent Cell Yield (Based on Wax Added) |
|---|---|---|---|---|---|
| 4.8 | 4 | 1 | 2 | 1,200 | 44.4 |
| 7.0 | 4 | 1.5 | 2 | 1,400 | 98.1 |

Example 4. Effect of reduced residence time of $O_2$ utilization and heat evolution In the same manner as described in Examples 2 and 3, continuous fermentations were made under identical conditions except for mean reactor residence time. Conditions were as follows:

FEED MEDIUM

|  | G./liter |
|---|---|
| n-hexadecane | 10.0 |
| 85% $H_3PO_4$ | 2.5 |
| KCl | 1.0 |
| $Na_2SO_4$ | 0.5 |
| $MgSO_4$ | 0.25 |
| $MnSO_4 \cdot H_2O$ | 0.04 |
| $FeSO_4 \cdot 7H_2O$ | 0.04 |
| $CaCl_2$ | 0.5 |

Balance tap water.

Reactor 7.5 liter, 4 liters liquid volume
Air feed rate 3.0 l./min.
pH maintained at 7.0 by $NH_4OH$ addition
Agitator speed 1500 r.p.m.
Temperature 35° C.

RESULTS

| Residence Time (Hours) | Selectivity (Wt. percent dried cells based on hexadecane consumed) | Oxygen Consumption, lb./.b. dried cells | $CO_2$ Production, lb./lb. dried cells |
|---|---|---|---|
| 4 | 1.13 | 1.27 | 0.97 |
| 2 | 1.30 | 0.89 | 0.62 |

Other similar tests have consistently given the same result. Although selectivity and $O_2$ consumption vary somewhat depending on other conditions, the trends with residence time are always the same.

Example 5.—Minimum generation time

Repeatedly with *Micrococcus cerificans* and adequate salt mediums such as shown in Examples 2 and 6, "logarithmic" growth has been observed in 7.5 liter reactors stirred at 1500 r.p.m. and with enough air fed to maintain the off-gas $O_2$ partial pressure above 0.1 p.s.i. The usual measure of logarithmic growth has been off-gas $CO_2$ concentration, which doubled every 45 minutes ±10 minutes. In some cases, cell concentration was also monitored and the results confirmed the $CO_2$ measurement. Thus, the minimum generation time for Micrococcus is 45 minutes ±10 minutes.

Example 6.—Criticality of inorganic salt reaction medium

*Micrococcus cerificans* was grown batchwise in shake flasks using 50 ml./500 ml. Erlenmeyer flask on a rotary shaker at 250 r.p.m. and a fermentation time of 70 hours on n-hexadecane and using the following inorganic salts medium:

|  | Grams/liter |
|---|---|
| $NaNO_3$ | 2.0 |
| $KaHPO_4$ | 1.0 |
| $MgSO_4 \cdot 7H_2O$ | 0.5 |
| $Fe_2(SO_4)_3$ | 0.01 |
| $MnCl_2 \cdot 4H_2O$ | 0.008 |
| $ZnSO_4 \cdot H_2O$ | 0.002 |

The pH was adjusted to 7.2 with 1 N HCl. A cell concentration of 2.0 mg./ml. was obtained which under these conditions amounts to a yield of 12.9% based on the amount of hexadecane charged. When the $NaNO_3$ concentration was increased to 12 grams/liter the cell concentration increased to 4.5 mg./ml. for a yield of 29%. Under identical conditions with the medium described in Example 2 cell concentrations of 9.4 mg./ml. were obtained and the yield was 60.6%.

Example 7

Using the conditions described in Example 2, residence time 2 hours, *Micrococcus cerificans* was grown on n-hexadecane at levels of approximately 1 to 2 wt. percent and air and pure $O_2$ as the sources of oxygen. When the hydrocarbon level was 1% there was very little effect of using pure oxygen. At a 2% hydrocarbon level, however, pure oxygen significantly improved hydrocarbon utilization as the following data show.

| n-Hexadecane Conc. (g./liter) | $O_2$ Source | Selectivity (g. cells/g. $C_{16}$ Conv.) | Hexadecane Conversion |
|---|---|---|---|
| 9.3 | Air | 1.14 | 96 |
| 10.9 | $O_2$ | 1.20 | 91 |
| 19.1 | $O_2$ | 1.13 | 85 |
| 19.1 | Air | 1.12 | 73 |

It is to be understood that this invention is not limited to the specific examples, which have been offered merely as illustrations, and that modifications may be made without departing from the spirit of this invention.

What is claimed is:

1. A process for preparing a high protein food which comprises continuously supplying a $C_1$–$C_{30}$ hydrocarbon, a nonlimiting liquid aqueous inorganic salts growth medium and excess oxygen containing gas to a vigorously stirred reactor containing said hydrocarbon, aqueous medium and a bacteria capable of growing on said hydrocarbon, the said bacteria being in the log phase (population increasing exponentially) of growth and being maintained in a concentration equal to or greater than that for which the exponential increase in population increment is equal to the increment continuously withdrawn, the liquid residence time in said reactor being maintained at 1.5 to 4 times the minimum generation time for the particular reactor, continuously removing a mixture of bacteria, aqueous medium, and unconverted hydrocarbon, and separating the bacteria to obtain directly an excellent animal food.

2. The process of claim 1 in which material separated from bacteria is recycled to the reactor.

3. The process of claim 1 in which the oxygen containing gas supplied to the reactor is 0.5 to 4 volumes of air/volume reactor liquid/minute per weight percent dry bacteria concentration in the reactor liquid residence time in hours.

4. The process of claim 1 in which the hydrocarbon is a normally gaseous hydrocarbon.

5. The process of claim 1 in which the hydrocarbon is a light naphtha.

6. The process of claim 1 in which the hydrocarbon is a 190 to 400° C. normal paraffin feed containing less than 0.1 wt. percent aromatics.

7. A process for preparing a high protein food which comprises continuously supplying a mixture of 0.1 to 10 wt. percent of a 190 to 400° C. normal paraffin feed containing less than 0.1 wt. percent aromatics in an inorganic salts aqueous growth medium and an oxygen contining gas to a stirred reactor inoculated with a bacteria capable of growing on said hydrocarbon, the residence time in said reactor being 1.5 to 2.5 hours, and wherein the bacteria is maintained in the log phase during said time period, continuously removing a mixture of bacteria, aqueous medium and unconverted paraffin, separating bacteria containing 80 to 95 wt. percent liquid based on dry cells, and drying the bacteria to obtain directly an excellent food.

8. The process of claim 7 in which the mixture supplied contains 1 to 5 wt. percent of the normal paraffin and the oxygen enriched air contains 90+% oxygen.

9. The process of claim 7 in which the inorganic salts aqueous growth medium is supplied in the following amounts, in each case wt. percent salt supplied based on product dried bacteria recovered per unit time; 0.05 to 0.25 wt. percent $H_3PO_4$, 0.025 to 0.05 wt. percent $Na_2SO_4$, 0.05 to 0.10 wt. percent KCl, 0.02 to 0.05 wt. percent $MgSO_4$, 0.02 to 0.05 wt. percent $CaCl_2$, 0.005 to 0.02 wt. percent $FeSO_4$ and 0.005 to 0.02 wt. percent $MnSO_4$.

10. The process of claim 7 in which reactor residence time is 1 to 2 hours, the mixture supplied contains 4 to 8 wt. percent of the normal paraffin and the oxygen enriched air contains 90+% oxygen, the amount of oxygen supplied is 1.5 to 2.5 lbs. per lb. of product dried bacteria recovered per unit time and the inorganic salts aqueous growth medium is supplied in the following amounts, in each case wt. percent salt supplied based on product dried bacteria recovered per unit time; 0.05 to 0.25 wt. percent $H_3PO_4$, 0.025 to 0.05 wt. percent $Na_2SO_4$, 0.05 to 0.10 wt. percent KCl, 0.02 to 0.05 wt. percent $MgSO_4$, 0.02 to 0.05 wt. percent $CaCl_2$, 0.005 to 0.02 wt. percent $FeSO_4$ and 0.005 to 0.02 wt. percent $MnSO_4$.

11. Process as defined by claim 7, wherein said bacteria is *Micrococcus cerificans*.

References Cited

UNITED STATES PATENTS

| | | | |
|---|---|---|---|
| 3,070,542 | 12/1962 | Ascher et al. | 208—310 |
| 3,193,390 | 7/1965 | Champagnat et al. | 99—96 |
| 3,268,413 | 8/1966 | Laine et al. | 195—3 |
| 3,268,419 | 8/1966 | Champagnat et al. | 195—82 |

OTHER REFERENCES

Stewart et al.: Journal Bacteriology, 78, 441–448.

LIONEL M. SHAPIRO, *Primary Examiner.*